Patented May 15, 1928.

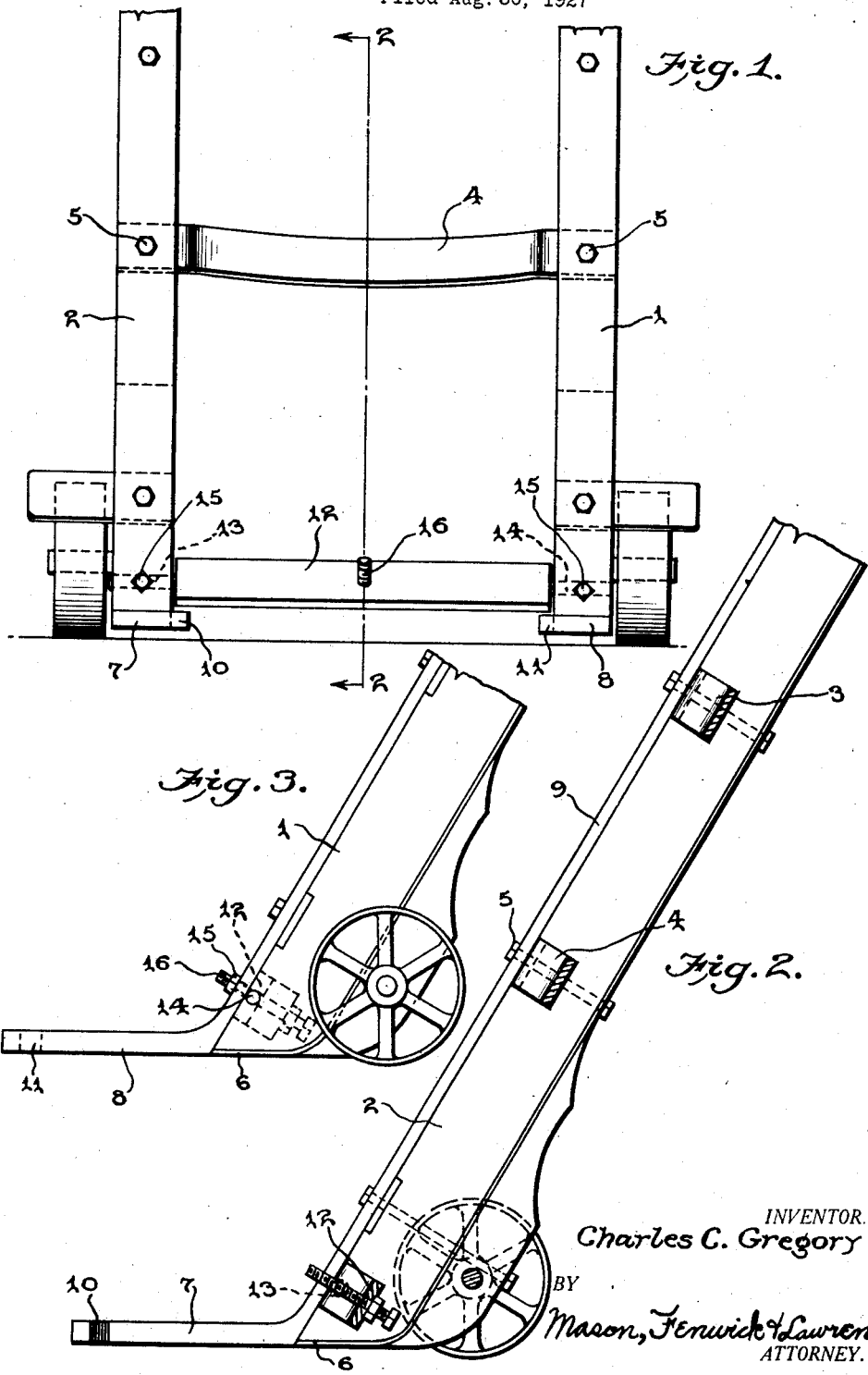

UNITED STATES PATENT OFFICE.

CHARLES C. GREGORY, OF NORFOLK, VIRGINIA.

HAND-TRUCK ATTACHMENT.

Application filed August 30, 1927. Serial No. 216,453.

This invention relates to improvements in attachments for hand trucks, particularly adapted for use in connection with trucks commonly used for the purpose of moving articles of merchandise, such as barrels and the like, on piers, in warehouses, storage buildings and other similar structures.

A prime object of this invention is to provide an attachment for a hand truck which will function to aid in adjusting the article of merchandise, similar to a barrel, in its relation to the truck in such a manner that when the truck is tipped rearwardly, the barrel will positively enter into proper operative relationship therewith, and eliminating the disadvantage and inconvenience commonly met with wherein the barrel, instead of being received on the truck, is usually tipped forwardly, compelling repeated attempts before the article has finally been properly located on the truck.

Another object of this invention is to provide an attachment for a hand truck which is inexpensive and simple of manufacture, and easily attached in position, means being connected to the lower outwardly extending projection of the truck in the form of guide members for the purpose of bringing the barrel in proper alignment with the truck and designating the time at which the truck should be tipped rearwardly for receiving the barrel, and means attached between the said frames of the truck in the form of a set screw or other suitable adjusting device against which the lower end of the barrel will contact and result in positively tipping the barrel rearwardly into the truck, as may be desired.

Other objects of this invention will appear from the following detailed description of the device and as disclosed in the single sheet of drawings which is herewith made a part of this application.

In the drawings—

Figure 1 illustrates a front elevational view of the lower portion of a hand truck disclosing the attachment in assembled relationship therewith.

Figure 2 illustrates a sectional view of Figure 1, taken along line 2—2.

Figure 3 illustrates a side elevational view of Figure 1.

Numerals 1 and 2 designate the side frames of a hand truck arranged in spaced relationship by means of suitable cross members 3 and 4, slightly concave in the ordinary manner, for receiving conveniently, containers holding articles of merchandise, particularly a container such as a barrel. The cross members 3 and 4 are adapted to be suitably connected to the side frames 1 and 2 by means of bolts 5.

It has been found from experiment that the outwardly extending arm located at the bottom of the truck as at 6 does not function satisfactorily in the procedure of placing merchandise upon a truck for the reason that in handling an article, such as a heavy barrel, the truck projections of the usual type can only be inserted underneath the barrel a short distance and when the truck is tipped rearwardly, the barrel has a tendency to tip forwardly, thereby compelling the employee to make another attempt, sometimes several, before the barrel is properly located upon the truck.

In order to remedy the above disadvantage, an attachment is provided by this invention wherein numerals 7 and 8 designate suitable gripping elements attached to the lower edges of the truck and outwardly extending therefrom, as clearly disclosed in Figures 2 and 3. The extensions 7 and 8 may be formed of any suitable material and be integrally cast with the iron binding element 9 which extends along the working surface of the truck frames 1 and 2.

In order to provide a guiding means for determining when the barrel or other articles is in a position for tipping on to the truck, suitable saw tooth projections 10 and 11 are formed at approximately the outer edges of the extensions 7 and 8. A cooperating feature of the attachment, according to this invention, is provided, and consists of a pivotally arranged cross bar 12 made of any suitable material and positioned near the lower ends of the side frames 1 and 2 as disclosed in the drawings, wherein numerals 13 and 14 designate the pins upon which the cross bar 12 is adapted to be pivotally mounted between the frames 1 and 2. Suitable set nuts 15 are arranged in cooperation with the pins 13 and 14 in such a manner that the bar 12 may be firmly located in position as may be desired. An adjustable set screw is adapted to extend through the approximate center of the pivotally arranged cross bar 12 as shown at 16 for the purpose of adjusting the device according to the different diameters of containers which may be handled by the truck.

In operation, this invention provides an attachment for a hand truck which is inexpensive and easy of application. When it is desired to move on the floor of a warehouse or other structure, articles such as barrels, the truck is moved to the usual position along side the barrel and adjusted in such a manner that the grips 7 and 8 extend about half way along each side of the barrel at approximately the bottom point thereof. The truck is then tipped rearwardly slightly until the saw tooth elements 10 and 11 function to grab or grip the sides of the barrel firmly, then the set screw element 16 is adjusted to fit snugly against the lower portion of the barrel, thereby providing means for adjusting the device to various diameters of the barrels. The truck is then tipped rearwardly in the usual manner and without exception it will be found that the barrel will be received in the truck, thereby eliminating the loss of time and labor in repeated attempts before the barrel has been properly located on the truck.

It is to be understood that alterations and substitutions may be made in the above disclosure, within the scope of the appended claims, without affecting the merits of the invention.

What I claim is:—

1. In combination with a hand truck for moving articles, side frames on the truck, a cross bar pivotally connected between the side frames, a set screw extending through the cross bar for contact adjustment to the varied surfaces of articles handled by the truck, means for firmly holding the cross bar in position on the side frames, gripping means connected to the lower ends of the side frames for bringing the article in proper alignment with the cross bar and set screw.

2. In combination with a hand truck for moving articles, side frames on the truck, a cross bar pivotally connected between the side frames, a set screw extending through the cross bar for contact adjustment to the varied surfaces of articles handled by the truck, means for firmly holding the cross bar in position on the side frames, gripping means connected to the lower ends of the side frames for bringing the article in proper alignment with the cross bar and set screw, inwardly extending projections on the gripping means for contact with the article to be moved.

3. The combination with a hand truck comprising a frame having side members connected by rails and having a cross rail near the bottom end of said members, of gripping means extending outwardly from the lower ends of the side members and provided with inwardly extending projections adapted to grip an article to be moved, and a set screw adjustable through said cross rail to form with said projections a three point gripping contact with said article.

In testimony whereof I affix my signature.

CHAS. C. GREGORY.